United States Patent [19]
Morgan

[11] 4,044,363
[45] Aug. 23, 1977

[54] LASER PHOTOCOMPOSITION SYSTEM AND METHOD

[75] Inventor: Grant T. Morgan, Delray Beach, Fla.

[73] Assignee: Dymo Industries, Inc., San Francisco, Calif.

[21] Appl. No.: 549,844

[22] Filed: Feb. 13, 1975

Related U.S. Application Data

[63] Continuation of Ser. No. 535,842, Dec. 23, 1974, abandoned.

[51] Int. Cl.² .......................... G06K 15/12; B41B 0/00
[52] U.S. Cl. ......................................... 354/5; 346/108; 350/6; 354/7; 354/8
[58] Field of Search .................. 354/5, 7, 8, 9, 10, 354/11; 346/108, 76 L; 350/6

[56] References Cited

U.S. PATENT DOCUMENTS

| | | | |
|---|---|---|---|
| 3,182,574 | 5/1965 | Fleisher et al. | 354/11 |
| 3,389,403 | 6/1968 | Cottingham et al. | 346/108 |
| 3,448,458 | 6/1969 | Carlson et al. | 346/76 L X |
| 3,573,847 | 4/1971 | Sacerdoti | 346/76 |
| 3,573,849 | 4/1971 | Herriot et al. | 346/108 |
| 3,701,999 | 10/1972 | Congleton et al. | 346/76 L |
| 3,820,123 | 6/1974 | Ammann | 354/7 |
| 3,836,709 | 9/1974 | Hutchison | 178/6.7 R |
| 3,898,627 | 8/1975 | Hooker et al. | 340/172.5 |

*Primary Examiner*—Joseph W. Hartary
*Attorney, Agent, or Firm*—James G. O'Neill

[57] ABSTRACT

Type characters are formed on a photo-sensitive surface by projecting a laser beam directly onto the photo-sensitive surface while moving the beam rapidly upwardly and downwardly, moving the beam steadily in a horizontal direction, and blanking the beam at selected times during the vertical movements. The horizontal movement gives horizontal dimensions to the characters and proportionally spaces them from one another to form composed lines of characters. The blanking of the beam is accomplished by providing a barrier near the optical path of the beam, and using an acousto-optic modulator to rapidly deflect the beam out of its path and against the barrier. A programmed computer is used to store information regarding the start and the stop of each blanking interval for each vertical stroke forming each of the characters of a substantial number of fonts of characters. An optical-electric feedback system is used to indicate the precise position of the laser beam relative to the photo-sensitive surface. This feedback arrangement includes a beam splitter for capturing a portion of the laser beam and projecting it onto an optical grating which is located in a fixed spatial relationship to the photo-sensitive surface. A photoelectric detector is used to detect the position of the laser beam and provide an electrical signal to time the operation of the vertical scanning and blanking devices. The speed of the machine preferably is increased by detecting the height of the characters in a line to be composed and, if the maximum height of any character is below a pre-determined level, then reducing the vertical scan distance traveled by the laser beam while increasing the horizontal and vertical scan rates.

30 Claims, 11 Drawing Figures

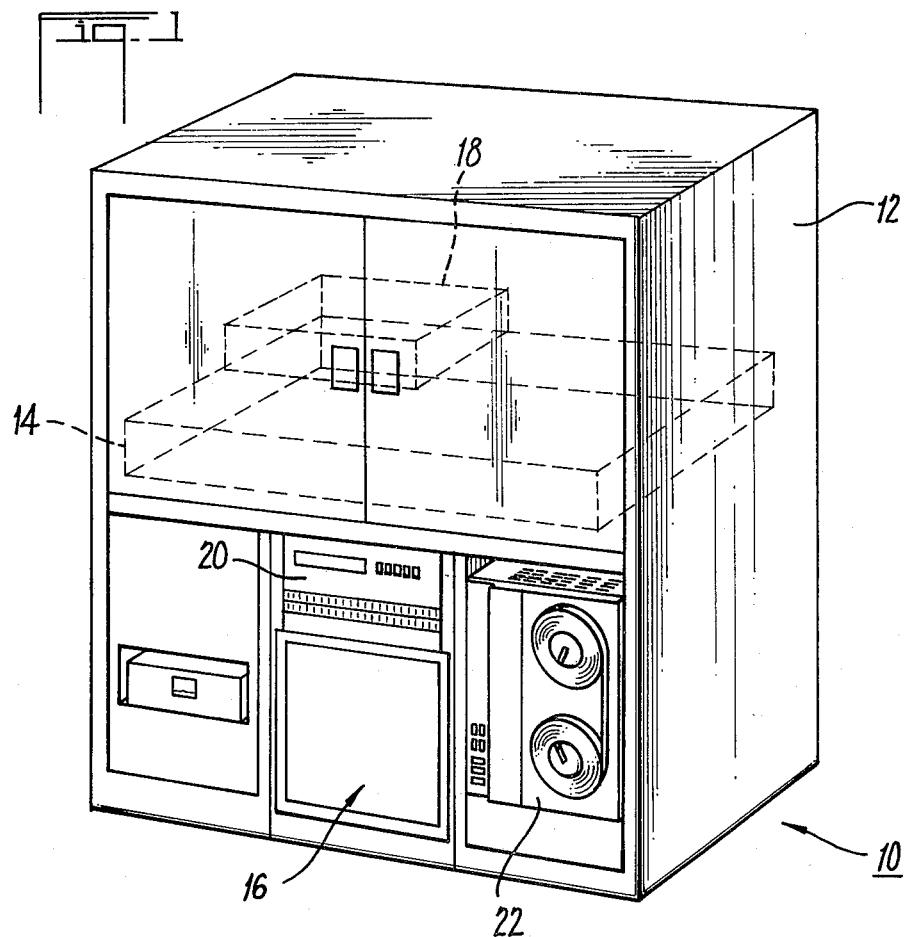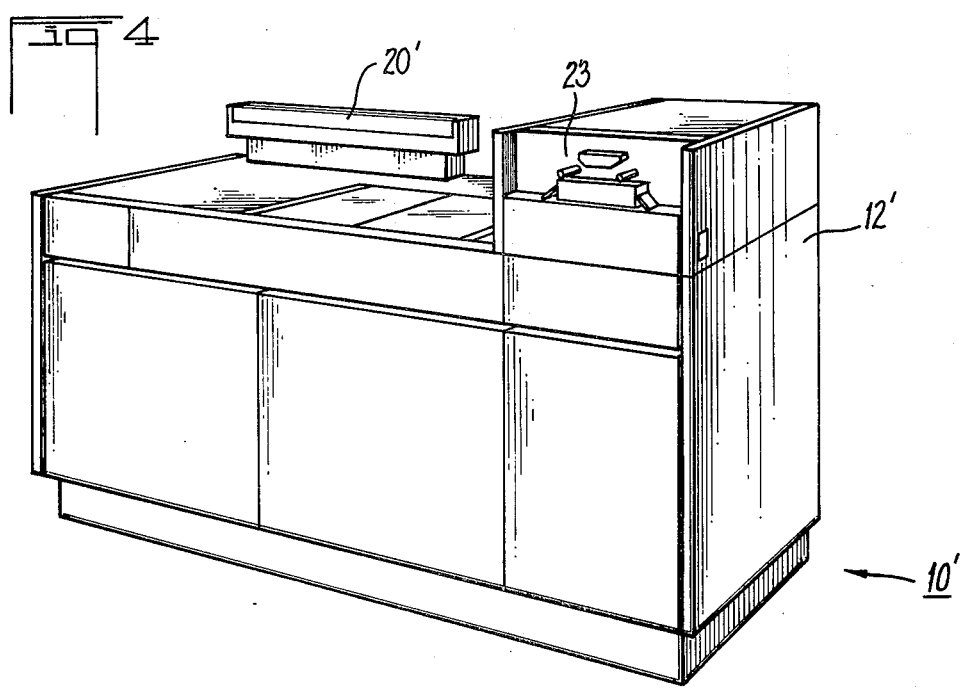

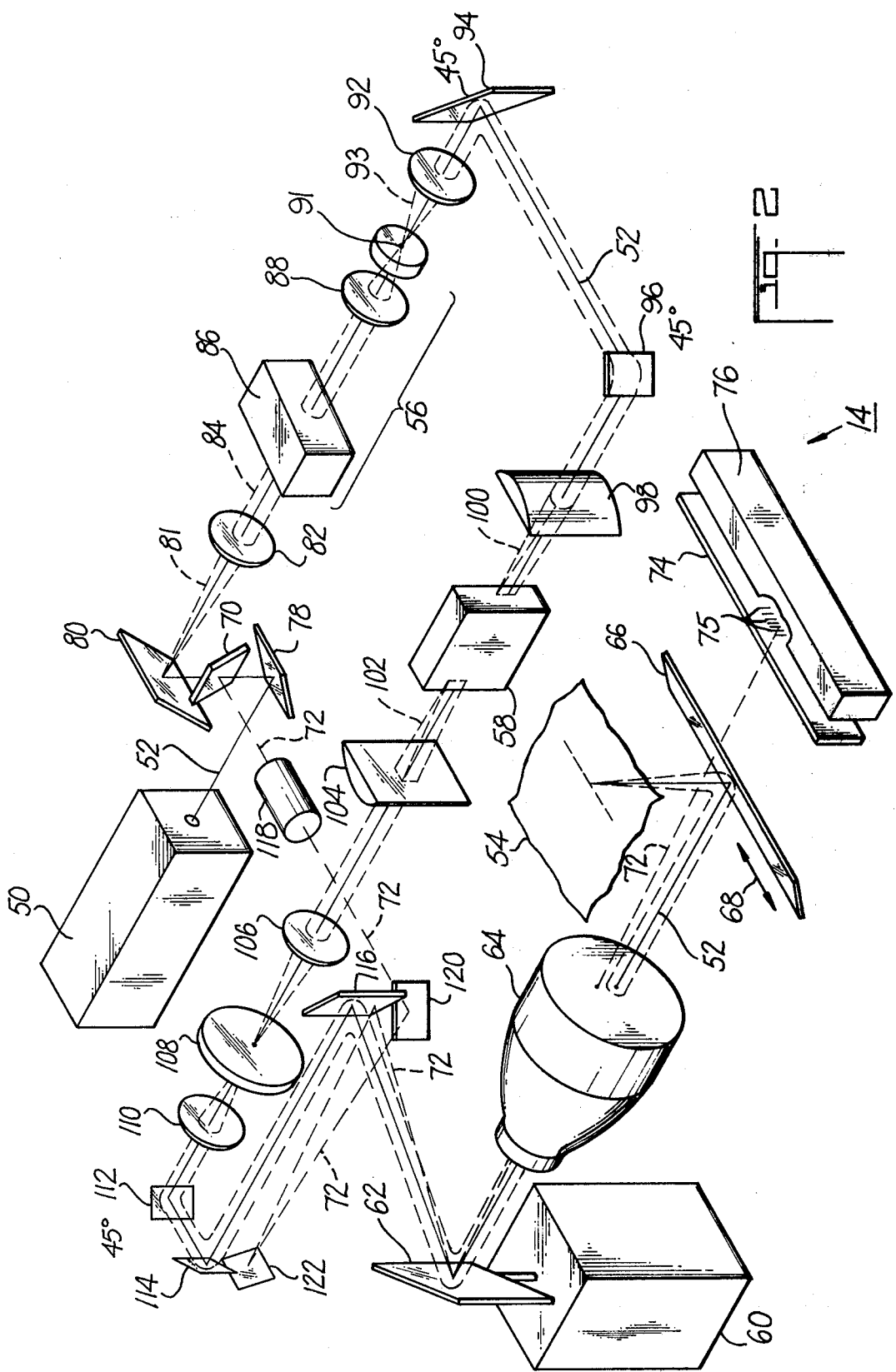

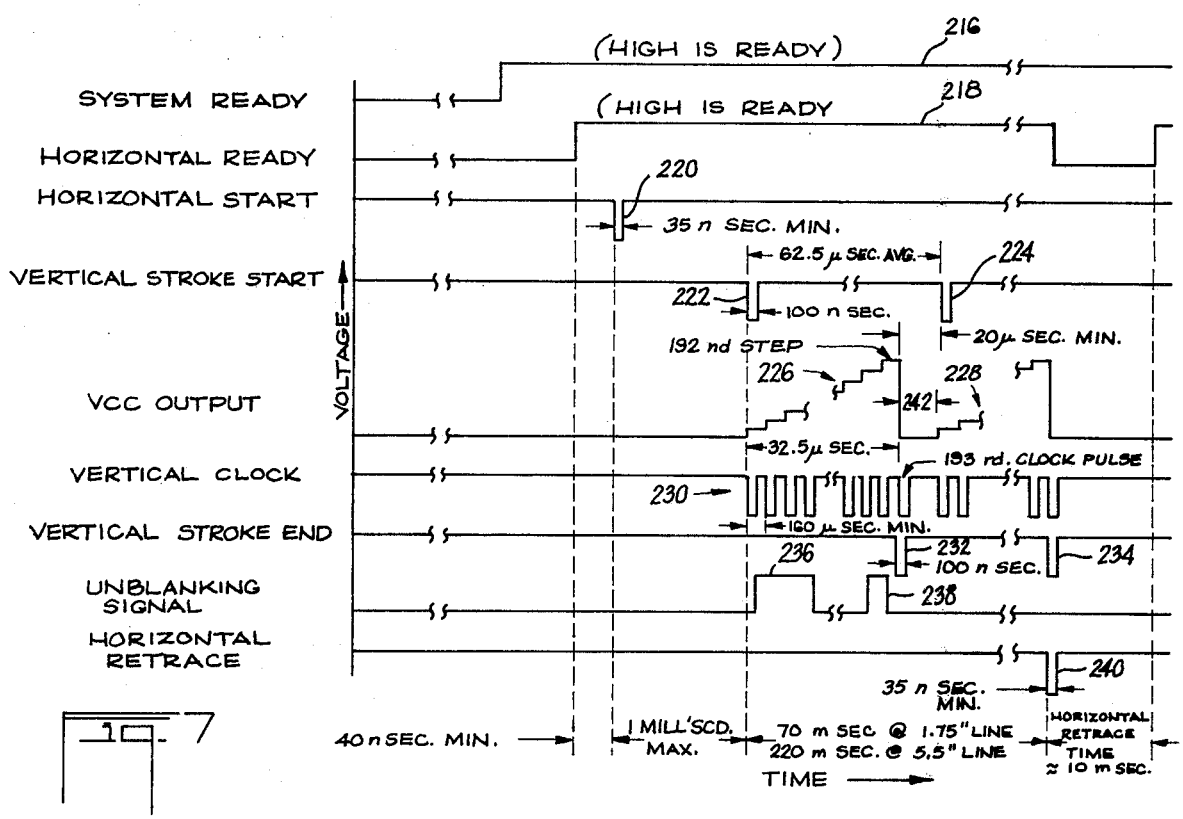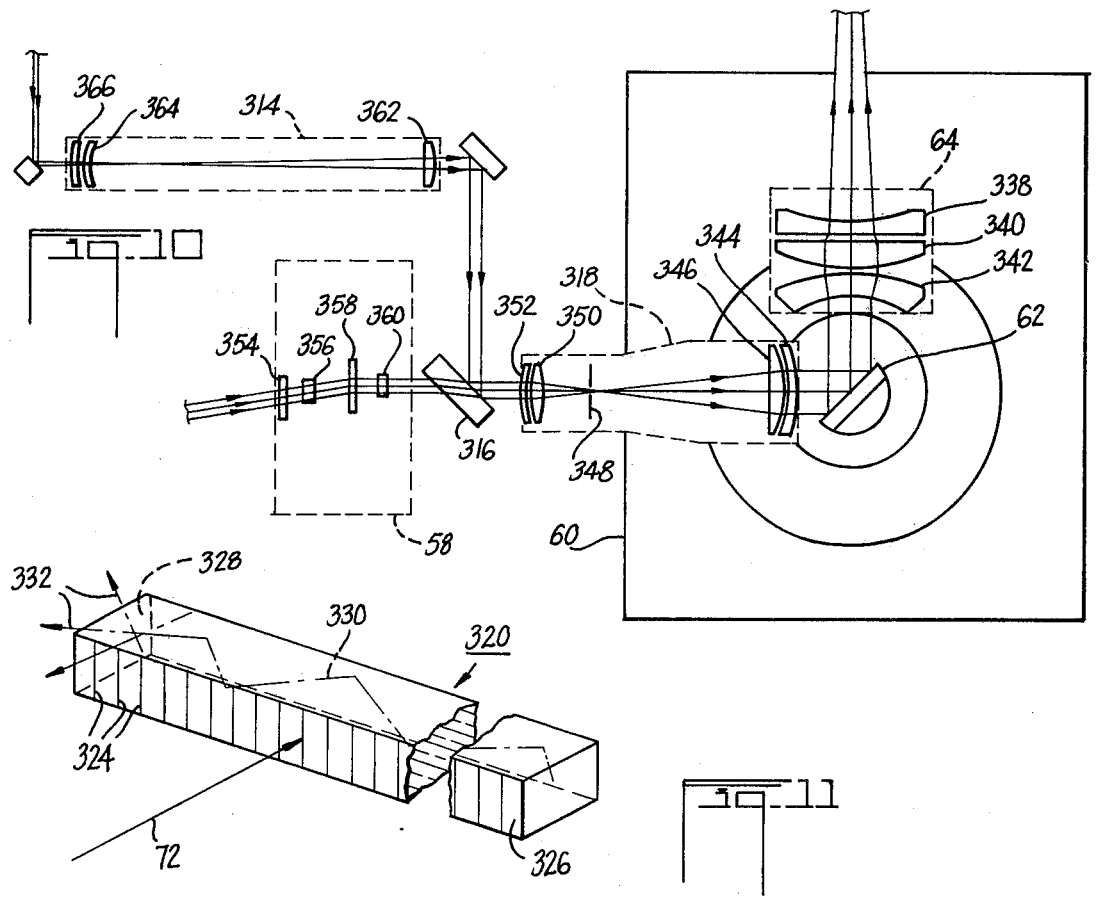

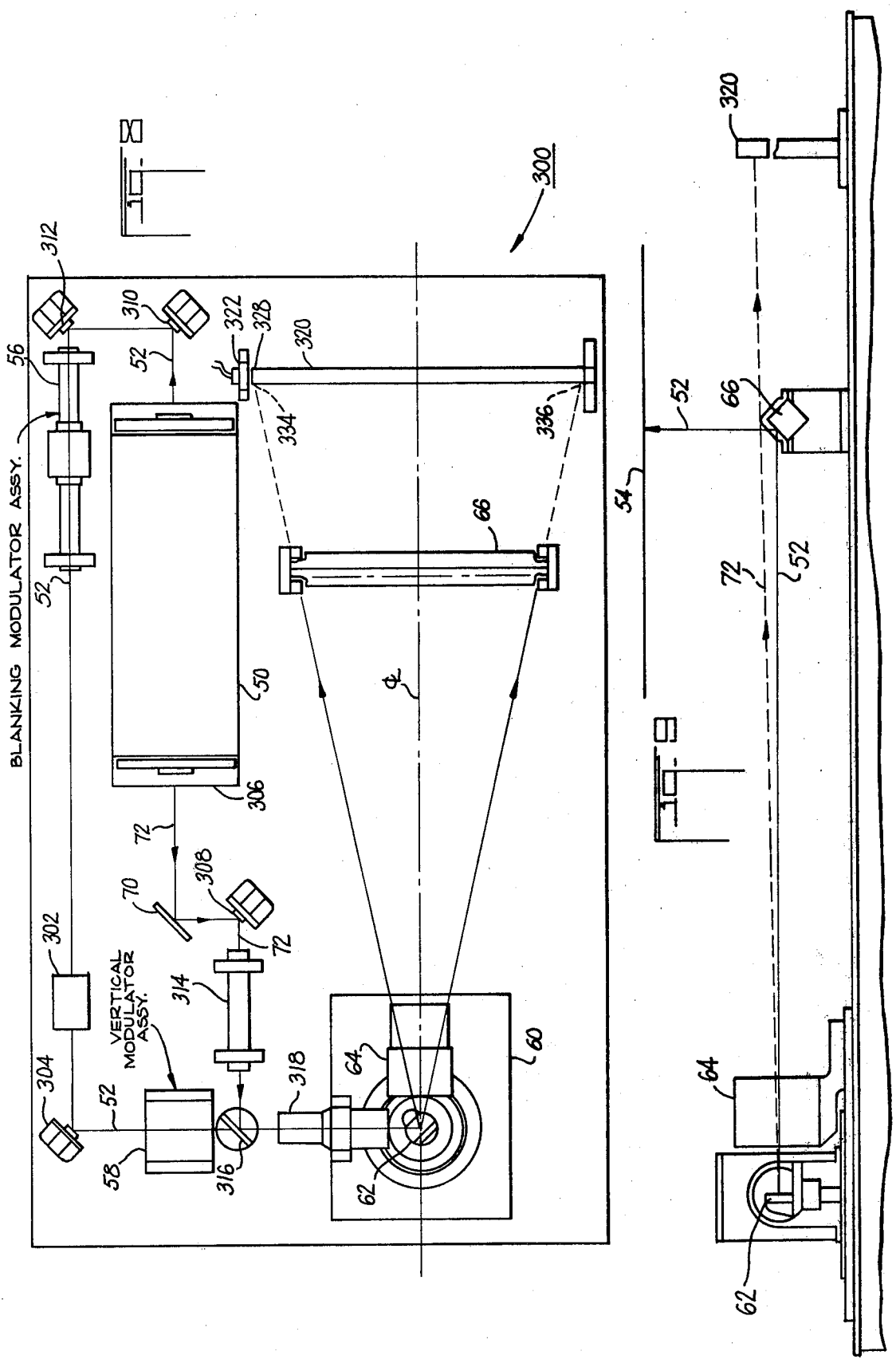

LASER PHOTOCOMPOSITION SYSTEM AND METHOD

This patent application is a continuation of U.S. patent application Ser. No. 535,842, filed Dec. 23, 1974 now abandoned.

TABLE OF CONTENTS

Field of the Invention
Prior Art
Objects of the Invention
Outline of the Invention
Description of the Drawings
General Description
Optical System
Control Circuit - General Description
Input Data - Slave Mode
Data Processing Functions
    a. Housekeeping Functions
    b. Forming Characters
Character Control Circuit Operation
    1. Definition Phase
    2. The Writing Phase
Full Aperture Mode
Oversized Characters
Circuit Components
Hyphenation and Justification
Preferred Embodiment This invention relates to photocomposition equipment and methods.

Photocomposition equipment which currently is the most widely used falls into major categories; machines which project light through images on matrices, which will be called "matrix" machines, and machines which form characters with the aid of a cathode ray tube (CRT), which will be called "CRT" machines.

The matrix machines, of which the Photon "Pacesetter" line of machines is a good example, have the advantages that they can produce relatively high quality type composition at moderately high speeds, and can be relatively simple and inexpensive. In addition, such machines can have a moderately high degree of versatility; that is, the are capable of composition with a reasonably good range of type sizes and styles.

The CRT machines, on the other hand, are capable of much higher speeds of operation and much greater versatility. The reason for this is that the characters are formed by scanning an electron beam over the phosphor surface of a cathode ray tube. The electron beam can be moved extremely rapidly, thus permitting the extremely high speeds. Furthermore, the information needed to generate the characters can be stored in a computer memory from which the information for new type faces and sizes can be retrieved much more rapidly than in a matrix machine. However, the usual CRT device is much more expensive than the usual matrix machine, and thus finds a much more limited market. Furthermore, the quality of the characters produced by the CRT machines often suffers because the phosphor screens tend to spread the spots formed on them by the electron beam, and because some prior CRT devices have hysteresis problems which tend to cause errors in the location of the spots on the screen. Also, the quality suffers from blemishes in the screens, and this is not easy to correct.

Another problem which exists in both types of machines is that it requires a substantial amount of time and labor to convert the photographic film or paper into a printing plate. First, the film or paper must be developed with the usual difficult darkroom procedures. Then, the developed film must be used to make a lithographic plate. Although special heat-developable photographic papers have been devised to eliminate the need for chemical development of film, and although lithographic plates have been proposed which can be exposed directly by the projected light images, these papers and plates require a relatively high level of light intensity (for high speed composition) which is difficult and expensive to provide in prior photocomposing equipment.

Matrix machines using laser sources as light sources have been proposed, as in U.S. Pat. No. 3,703,138. Although the laser source provides light of adequate intensity, the speed and versatility of such machines is limited and there are other problems with such machines.

Accordingly, it is an object of the invention to provide a photocomposition machine and process which has very high speed and versatility, while being substantially less expensive then prior equipment having comparable capabilities. Furthermore, it is an object to provide such a machine and method which is capable of forming character images of relatively high quality. It also is an object to provide such a machine and method which produce character images which have much higher light intensity than previously available and thus permit composition on new heat-sensitive photographic papers, or directly on pre-sensitized lithographic or relief-type plates instead of the usual photographic film or paper so as to simplify and reduce the cost of photocomposition.

In accordance with the present invention, there is provided a photocomposing device having a laser beam source with means for projecting the beam onto a photo-sensitive surface. Deflecting means are provided for moving the beam back and forth in two transverse directions. Means also is provided for blanking the beam in accordance with a program so as to form character images and space them proportionally on the photo-sensitive surface. A preferred specific feature of the invention is an arrangement in which a portion of the laser beam is projected onto a photo-electric device which provides an electrical signal precisely indicating the position of the beam relative to the photo-sensitive surface. This signal is used to control the timing of the operation of the deflecting means and blanking means so as to form precisely outlined characters of good quality while spacing and locating them on the film with the precision required for commercial type composition.

The speed of the machine of the present invention can be made very high because all that need be moved are the weightless laser beams. However, the machine can be made considerably less expensively than CRT machines because it avoids the expense of forming a vacuum envelope for the CRT tube, as well as a phosphor screen for the tube, and also avoids using the expensive correction devices needed to correct for errors created by the use of such a phosphor screen. Also avoided is the expensive high-voltage deflection circuitry needed for CRT's. The speed of the machine can be increased by detecting the heights of the characters and changing the rate of movement of the laser beam inversely to the character height; that is, the smaller the characters, the higher the speed and vice-versa.

The light intensity of the character images easily is sufficient to properly expose present-day heat-developable photographic papers. The light intensity also can be made sufficient to directly project the characters on pre-sensitized lithographic or relief-type plates, thus saving considerably in the expense of converting the photographic output of the photocomposition process into printing plates.

The quality of composition is intrinsically better than that in CRT machines because there is no phosphor to spread the light spots, and no hystereis as in the CRT machines. This makes it possible to produce smaller, more precisely located light spots on the photographic film or paper, thus sharpening the images and giving the images cleaner outlines.

The foregoing and other objects and advantages of the invention will be set forth in or apparent from the following description and drawings.

In the drawings:

FIG. 1 is a perspective view of a machine constructed in accordance with the invention;

FIG. 2 is a perspective schematic view of the optical system in the machine shown in FIG. 1;

FIG. 4 is a perspective view of a preferred form of the machine of FIG. 1;

FIG. 7 is a waveform diagram explaining some of the operational features of the invention;

FIG. 8 is a plan view of the preferred embodiment of the optical system of the invention;

FIG. 9 is an elevation view of the system shown in FIG. 8;

FIG. 10 is a detailed plan view of a portion of the system shown in FIGS. 8 and 9; and FIG. 11 is a schematic diagram illustrating the operation of a portion of the system shown in FIGS. 8 through 10.

GENERAL DESCRIPTION

Figure 3:
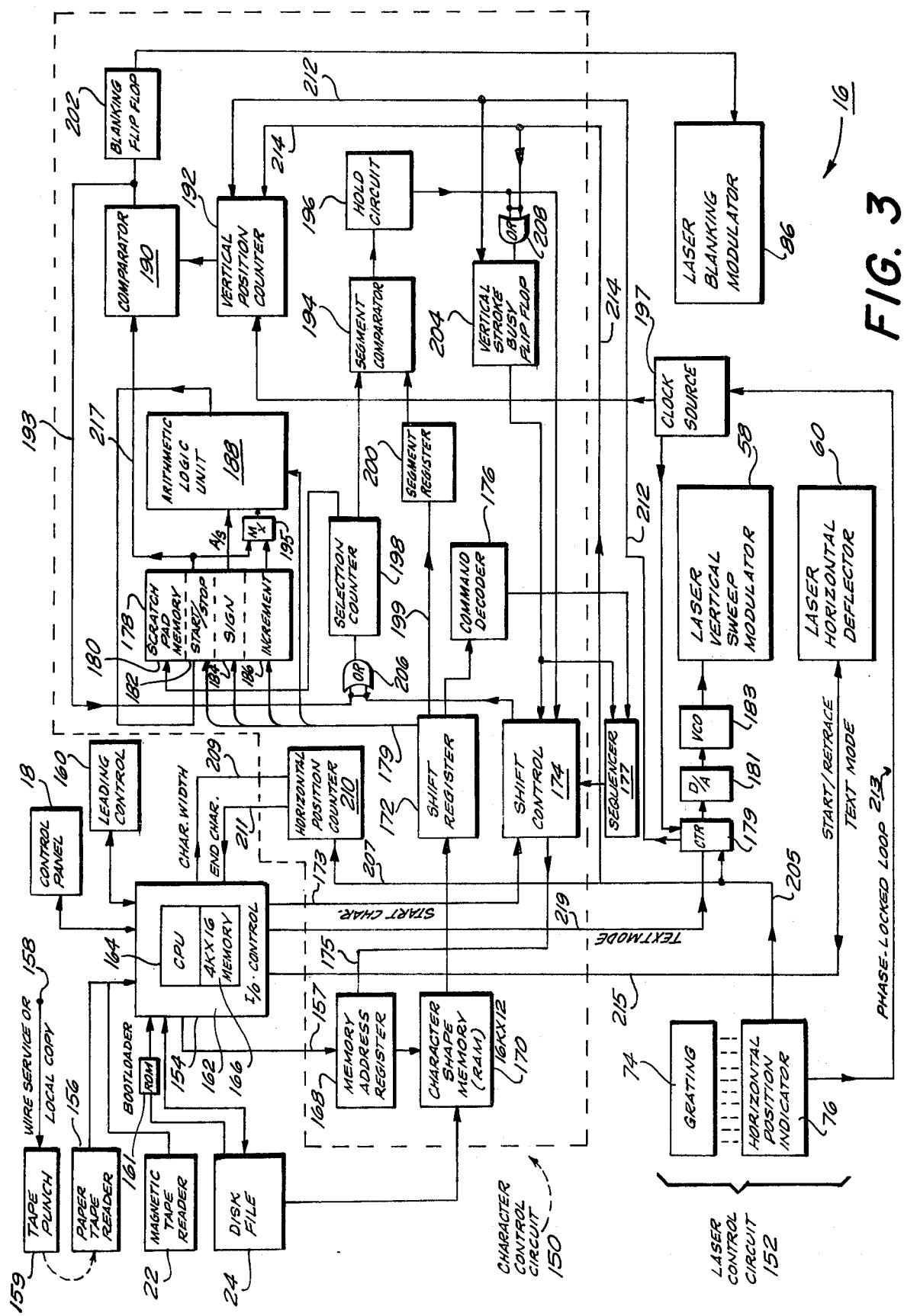
FIG. 3 is an electrical schematic circuit diagram for the machine shown in FIGS. 1 and 2.

FIG. 1 shows a photocomposition machine 10 which has been built and successfully operated in accordance with the present invention. The machine includes a housing 12, an optical system 14 inside the upper portion of the housing and an electrical system 16. A film cassette 18 is provided to hold the film on which the characters are to be composed. The machine includes a control panel 20, a magnetic tape reader 22 and a magnetic disc file 24 (not visible in FIG. 1) for storing some of the character and control program information. The machine is operated with information input from magnetic tape read by the tape reader 22, but also can be operated by a cable-connected computer, or with paper tape, if desired. The magnetic or paper tape can be either so-called "idiot" tape, that is, without line-ending or justification information, or tape containing such information after preparation either by a computer, or by an operator using a counting keyboard.

The machine can produce good composition on conventional photocomposition film or paper, or on heat-developable papers. With modifications to increase the laser power and/or increase the exposure time, the machine can produce copy directly on photographically-sensitized lithographic plates.

OPTICAL SYSTEM

FIG. 2 of the drawings illustrates schematically the optical system 14 of the machine 10 shown in FIG. 1. The optical system includes a continuous laser beam source 50 which produces a laser beam which is directed along an optical path 52 which is indicated in solid lines in FIG. 2. The beam eventually reaches a sheet of photographic film or paper 54 which is located in the film cassette 18 of FIG. 1. Only a portion of the film is shown in FIG. 2, and the cassette 18 has been omitted for the sake of clarity in the drawings.

The laser beam passes through an acousto-optical shutter 56 which is used to selectively blank the laser beam; that is, the device 56 is used to prevent the laser beam from reaching the film when it is desired for the beam to produce no image on the film 54.

The laser beam next is modulated by an acousto-optical cell 58 so as to cause the beam to move up and down very rapidly. The laser beam then is reflected onto a rotatable mirror 62 which is rotated by a drive motor 60 to sweep the laser beam across the film in the horizontal or "X" direction. The laser beam then passes through a field-flattening lens 64, and is reflected off of a mirror 66 and onto the film 54. The deflector device causes the beam to sweep back and forth across the film in the direction indicated by the arrow 68 so as to cause the vertically-scanning beam to trace along many very closely-spaced tracks across the film. Whether the beam leaves a photographic image on the film or not depends upon whether it is blanked or it is not blanked at a given instant of time. The blanking and unblanking of the beam is controlled by the electronic control system 16 shown in FIGS. 1 and 3 of the drawings, and will be explained in greater detail below.

In accordance with one of the preferred features of the invention, a beam splitter 70 is positioned in the optical path 52 so as to intercept the laser beam and reflect a portion of it along a separate optical path indicated by dashed line 72 towards the X deflector, through the field flattening lens 64, above the mirror 66, and onto a grating plate 74. The grating plate 74 is held in a stationary position and has a reticle formed of closely-spaced lines 75. A few of the lines 75 are shown in FIG. 2, and their spacing has been exaggerated for the sake of clarity. The grating lines actually extend over the full width of a line of composition to be projected onto the film. The light which is transmitted through the grating is detected by a horizontal position indicator device 76.

The device 76 includes a linear photo-electric detector which detects laser radiation coming through the grating and produces one pulse whenever the laser beam moves by the distance between adjacent lines 75. A multiplier circuit (not shown in FIG. 2) is provided to create three additional pulses in response to each such pulse. This is done because the lines 75 economically or easily cannot be placed as close together as the desired spacing between vertical strokes of the laser beam. The electrical signals produced by the device 76 thus precisely indicate the position of the laser beam with respect to the film 54 and, as it will be explained in greater detail below, provide a means for timing the operation of the blanking means and other components of the system so as to produce precisely-spaced and located type composition of good quality.

The grating 74 is located at the focus of the lens 64. The photo-detector is a conventional elongated semiconductor photo-diode device, such as the Model L-9, manufactured by United Detector Technology, Inc.

Now considering the optical system 14 in greater detail, the blanking device 56 includes a known acousto-optical laser beam modulator 86, a condensing lens 88, and an aperture plate 91. The modulator 86 is the DLM-20 manufactured and sold by Datalight, Inc. Since the operation of the device is known, it will not be described in detail. However, the basic mode of operation of the device is as follows: The laser beam is transmitted through a block of glass which is flexed very rapidly by high-frequency ultrasonic pressure waves. The waves are induced in the glass by means of ultra-sonic transducers secured to the glass block. Flexing of the glass causes the laser beam to be deflected through an angle which is directly proportional to the frequency of the ultra-sonic waves. By varying the frequency of the ultra-sonic waves between two fixed values (e.g. 50 and 100 megahertz) the beam either is allowed to travel along the optical axis 52 or is deflected slightly from that axis.

The lens 88 focuses the laser beam at the small central aperture 91 of the aperture plate 90. The plate is opaque except for aperture 91. Thus, when the laser beam is deflected away from the axis 52, the aperture plate 90 serves as a barrier which blocks the transmission of the laser beam any further. In this manner, the beam is blanked when ultrasonic energy at one of the two frequencies is applied, and the beam is transmitted when energy at the other frequency is applied.

The use of the blanking device 56 has the advantage that it completely blocks the transmission of the laser beam when it is operating in the blanking mode, thus preventing the appearance of undesired traces of light on the film. Furthermore, the blanking device 56 operates very rapidly. For example, the rise time of the modulator 86 is specified as 15 nano-seconds; that is, 15 $\times 10^{-9}$ seconds.

The vertical deflector 86 is an acousto-optical cell like the cell 58. The energization of the cell 86 also consists of a high-frequency signal, but it is one whose frequency is varied rapidly back and forth between two levels so that the laser beam is rapidly deflected in a continuous up and down motion.

The laser source 50 is a continuous wave gas-laser source such as the Spectra-Physics Model 162 air-cooled argon laser which has an output of 10 milliwatts at 488 nanometers, a beam diameter of 0.65 mm, and a beam divergence of 1 milliradian. Other laser sources can be used, such as a helium-cadmium laser operated at a wave length of 441.6 nono-meters. The later laser is particularly low in cost, although not yet as long-lived as the other mentioned above.

The laser beam 52 is deflected through two 90° angles by two mirrors 78 and 80, between which is located the beam splitter 70. The reason for use of the two mirrors 78 and 80 is to raise the plane of the laser beam path to the level of the optical system.

The beam reflected off the mirror 80 has a very thin diameter and has an envelope shown by dashed lines 81 in FIG. 2. The size of the outline 81 is exaggerated for the purpose of illustration.

A beam expender lens 82 is provided to expand the diameter of the laser beam. Thus, the beam emerging from the lens 82 is shown with a larger envelope 84. The purpose of this is to widen the diameter of the beam so as to optimize its shape for use with modulator 86.

The condensing lens 88 focuses the laser beam at the aperture 91 of the aperture plate 90. The beam then spreads outwardly, as it is indicated by the conical beam outline 93, and is re-collimated by a lens 92. The beam then is reflected through two 90° angles by two mirrors 94 and 96. Then the beam passes through a semi-cylindrical lens 98 which shapes the beam into a thin vertical line as indicated by the outline 100, with the beam being focused on the vertical deflector 58.

The beam emerging from the deflector 58 passes through another semi-cylindrical surface opposite to that of the lens 98. This re-collimates the modulated laser beam emerging from the vertical deflector 58.

The modulated beam then passes through a condensing lens 106, an aperture plate 108 and an expanding lens 110 for the purpose of reducing the divergence of the beam. The beam then is reflected through two 90° angles by mirrors 112 and 114 to a mirror 116, and then to the swinging mirror 62. The modulated beam then is transmitted through the field flattening lens 64, which is of conventional construction and which keeps the laser beams in focus on the film 54 and the grating 74, respectively, despite the fact that the distance traveled by the beams in going from the mirror 62 to the film or grating plane changes at varying distances from the center of the lens.

The portion 72 of the laser beam which is directed onto the grating 75 (sometimes referred to as the "sense" beam) is guided through a collimator 118, towards a mirror 120 which is below mirror 116 and reflects the beam 72 towards a mirror 122. The mirror 122 is inclined slightly with respect to vertical so as to reflect the sense beam up towards the mirror 116, which reflects the sense beam onto the rotatable mirror 62. When the sense beam emerges from the lens 64, it is directly above the modulated beam 52 (sometimes referred to as the "write" beam) so that is will miss the mirror 66 and strike the grating 75.

The X deflector device 60 consists of a model No. 306 manufactured by General Scanning Corp., and a mirror 62 such as No. 068670 manufactured by Datalight, Inc. The beam splitter 70 is a No. MPM 15-5 by Labda Airtron Optical, Inc.

CONTROL CIRCUIT — GENERAL DESCRIPTION

FIG. 3 is a block diagram of the control circuit 16 of the machine 10. The control circuit 16 includes a data processer 154, a character control circuit 150 enclosed in dashed outline, a laser control circuit indicated at 152, the magnetic tape reader 22, the disk file 24, the control panel 18, and a leading control circuit 160. Optionally, a paper tape reader 156 can be used as an input device. It receives paper tape prepared on a tape punch 159 either by an operator producing "local copy," or from a wire service input line 158.

Before the control circuitry and data processing for the composition of characters can be explained, the data storage and input scheme should be understood.

INPUT DATE — SLAVE MODE

The following description is of the machine 10 when it is operating as a "slave" machine; that is, it is operated by magnetic or punched tape which has been prepared by a computer or is cable-connected directly to a computer. The tape or the computer supplies hyphenation, justification and other information. The slave machine has no hyphenation or justification capabilities of its own.

Table I illustrates the code structure for the information appearing on the magnetic tape read by the tape reader 22 when the machine 10 is operated in the slave mode.

operation of the machine. A 1 in bit position 7 indicates the full aperture mode of operation; that is, the mode of operation in which the vertical distance scanned by the laser beam is at its maximum, thus allowing characters over ten points to be composed.

A 0 in bit position 7, together with 0 in the 5 and 6 positions identifies the "text aperture" mode of opera-

TABLE I
INPUT CODE STRUCTURE

| INFORMATION STORED | | CODES USED | | | | | | | | | | | | | | |
|---|---|---|---|---|---|---|---|---|---|---|---|---|---|---|---|---|
| | | 1ST FRAME | | | | | | 2ND FRAME | | | | | | | | |
| | | 1 | 2 | 3 | 4 | 5 | 6 | 7 | 8 | 9 | 10 | 11 | 12 | 13 | 14 | 15 | 16 |
| Fixed Width | | 0 | 0 | 0 | 0 | MSB | | | | | | Width in Strokes | | | | | LSB |
| | Std. Width | | | | | 0 | 0 | | MSB | | | | | | | | LSB |
| Font Change | 2 × Width | 0 | 0 | 0 | 1 | 0 | 1 | * | | | | Font Number | | | | | |
| | 3 × Width | | | | | 1 | 0 | | | | | 0 – 383 | | | | | |
| | 4 × Width | | | | | 1 | 1 | | | | | | | | | | |
| Add Lead | Forward | 0 | 0 | 1 | 0 | 0 | MSB | | | | Leading in 1/2 points | | | | | | LSB |
| | Reverse | | | | | 1 | | | | | | | | | | | |
| | Rewind - no cut | | | | | 0 | 0 | | | | | | | | | | |
| Stop | No rewind - cut | 0 | 0 | 1 | 1 | 0 | 1 | | | | | N/A | | | | | |
| | No rewind - no cut | | | | | 1 | 0 | | | | | | | | | | |
| | Rewind - cut | | | | | 1 | 1 | | | | | | | | | | |
| End of Line | Forward | 0 | 1 | 0 | 0 | 0 | MSB | | | | Leading in 1/2 points | | | | | | LSB |
| | Reverse | | | | | 1 | | | | | | | | | | | |
| End of Record | | 0 | 1 | 0 | 1 | | | | | | | N/A | | | | | |
| Select Disk Pack | | 0 | 1 | 1 | 0 | | MSB | | | | Pack Configuration No. | | | | | | LSB |
| Display | | 0 | 1 | 1 | 1 | | MSB | | | | Page No. | | | | | | LSB |
| Character | | 1 | MSB | | | Character | | | LSB | MSB | Character Width in Identity | | | | | | Strokes |

*1 = Full Aperture
 0 = Text Aperture if Width is Standard (00)
 0 = Split Aperture if Width is Not Standard (not 00)
All Data is with Odd Parity Standard The information stored on the tape is stored in first and second frames; that is, each item of information is represented by two bytes or data word of eight bits apiece, arranged physically in successive rows on the magnetic tape, with odd parity coding. The bit numbers 1 through 16 appear at the top of the first frame and second frame columns in Table I.

The first bit in the first frame of each code identifies the information as either "character" information or "function" information. If the first bit is a 1, this identifies the information as character information. If the first bit is a 0, then the informaiton is identified as function information.

Considering first the character information at the bottom of Table I, it can be seen that the last 7 bits of the first frame are used to identify the character. The notations "MSB" and "LSB" indicate the most significant and the least significant bit, respectively, in the character identity code. The MSB and LSB notations throughout the remainder of Table I have the same meaning.

The entire 8 bits of the second frame of the character information is used to store the character widths; that is, the number of strokes of the laser beam which it takes to compose that character. A number of strokes up to 256 can be stored.

The tape reader 22 in the machine is arranged so that it reads in information in blocks of up to 768 data words. Therefore, the data is arranged on the input tape in corresponding blocks of up to 768 words. Each block must have an "end of record" code preceded by either a "stop" command or "end of line" command.

Some of the first information in each data block will be font change information. Referring to Table I, bits 2, 3 and 4 in the first frame are used to identify the information as font change information. Bits 5 and 6 in the first frame are used to identify whether the characters to be composed are of standard width, of 2, 3, or 4 times standard width. Bit 7 is used, partially in combination with bits 5 and 6, to indicate one of three modes of tion; that is, a mode of operation, to be described more fully below, in which the height of characters in a line is measured by the computer preparing the input tape, in advance of compositions of the line. If no character in a line is greater than 10 points in size, the vertical scan distance is reduced proportionately and the horizontal scan speed is increased proportionately so as to significantly speed the operation of the machine. This enables the high-speed composition of what is know as "straight matter;" that is, text matter for newspapers and the like.

If there is a 0 is bit position 7, and a 1 in either of bit positions 5 and 6, then the "split aperture" mode of operation is indicated. In this mode, characters of a point size larger than a certain maximum value are composed in two separate passes instead of one. This is necessary because there is a certain maximum vertical deflection of the laser beam which does not permit forming very large characters in one horizontal scan or pass.

The final nine bits, in positions 8 through 16, are numbers representing the font which has been selected. Numbers from 0 to 383 constructed and tested; that is, information for up to 384 fonts is available.

In Table I the "Fixed Widths" code indicates a white space which is to be composed. Bits 2, 3 and 4 identify the code, and the width of the white space, in number of strokes is represented by the remaining 14 bits.

The "Add Lead" information represents special leading or paper or film advance, other than that provided at the end of a line, to be used in spacing the lines of compositions from one another on the film for special purposes. The amount of leading is represented in quarter-point increments by bits 6 through 16. Bit position 5 indicates whether the leading is forward or reverse.

The "Stop" information indicates four modes of operation; one in which the magnetic tape is rewound, but the film or paper is not cut; a second in which the magnetic tape is not rewound but the film or paper is cut; a third in which the magnetic tape is not rewound and the paper or film is not cut, and a fourth in which the magnetic tape is rewound and the film or paper is cut. The identification of the modes of stopping is given by the bit positions 5 and 6.

The End of Line information automatically causes leading in an amount represented by bit positions 6 through 16. The forward or reverse direction is indicated in bit position 5.

The End of Record instruction indicates the end of one block of up to 768 words, as it has been explained above.

The Select Disk Pack instruction directs the machine to select information from a new disk pack, and gives he identification of that pack in bit positions 5 through 16.

Finally, the Display Information merely is an instruction for the machine to display a certain message on the operator panel 20 in order to inform the operator of certain operating conditions within the machine. Page numbers of the input data also are indicated on the display in the search mode of operation, as it will be explained in greater detail below.

DATA PROCESSING FUNCTIONS

Referring again to FIG. 3, the data processor 154 includes a central processing unit (CPU) 164, a central memory 166 and an input/output control section 162. The central memory 166 has a capacity, for example, of 4 K words (4,096 words) of 16 bits each.

The disk file unit 24 is conventional and consists of a plurality of spinning magnetic disks on which a relatively large amount of data is stored. The data stored in the disk file unit includes control program data, character shape or stroking information for a large number of fonts (up to 384), and the relative starting addresses in the disk memory for each font.

The control program for the machine 10 has two functions; housekeeping functions and character processing functions.

a. Housekeeping Functions

The housekeeping functions consist generally of loading the control program into the central memory 166, checking for input/output errors, storing stroking information in a character shape memory 170 forming a part of the character control circuit 150 shown in FIG. 3, displaying all messages on the external display of the machine, controlling the reading of blocks of input data into the machine, and similar functions.

A read-only memory "bootloader" start-up device 161 (FIG. 3) is provided to start the operation of the machine. The bootloader 161 loads information stored in the first disk sector into the first 256 words of the central memory 166. After the bootloader has performed its function, a conventional program control counter (not shown) is set at 0, and a conventional program loader (also not shown) reads the rest of the control program into the memory 166.

Figure 5:
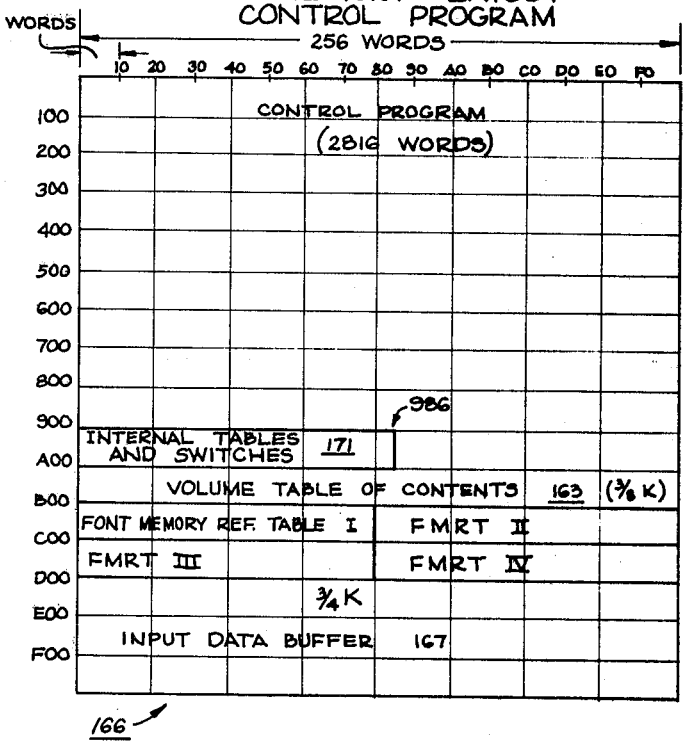
FIG. 5 is a schematic diagram of the arrangement of information stored in the central memory of the device 10 of FIG. 1.

FIG. 5 of the drawings shows the arrangement of data in the central memory. As it can be seen from FIG. 5, the control program occupies the first 2,816 words of memory. After the control program has been loaded into memory 166, the "Volume Table of the Contents" 163 is loaded into a 3/8 K portion of the memory. The Volume Table of Contents gives the starting address in the disk pack for the stroking information for each font.

An input data buffer 167 occupying 3/4 K, and internal switches 171 occupying 1/8 K of memory also are provided.

Finally, up to four memory reference tables for four different fonts are stored in font memory reference table sections I, II, III, IV. Each font memory reference table contains the relative starting address of the stroking data for each individual character within a given font.

Since the memory 166 is of the random access variety, access to the information in the font memory reference tables is very rapid. Since access to information in the disk file 24 is "serial" and slower than access to information in memory 166, it is preferred to store starting address information for as many fonts as possible in the memory 166. In fact, the speed of operation of the machine can be increased by supplying more memory capacity to increase the number of font memory reference tables which can be stored in memory 166.

The loading of the font memory reference tables I, II, III and IV actually occurs during type composition. One of the first commands on all input tapes is a font change command. The code identifying the font is added to the volume table of contents 163 (FIG. 5) in order to look up the starting address of that particular font on the disc. When the information for that font is found on the disk, the first information on the disk is the font memory table which is loaded into one of the font memory table areas of the memory 166.

Referring again to FIG. 3, the next data which appears on the disk is the character shape or stroking information which is read into a character shape memory 170. The memory 170 is a random access memory with a capacity of 16 K words of 12 bits each. The machine then proceeds with character formation and the composition of characters in the manner to be described in greater detail below.

Subsequently, when a new font change signal is read in from the input tape, the program runs a routine in which it is determined whether the information for that font already is stored in memory. If so, the housekeeping part of the program simply indicates which one of the blocks of stored data is to be used. If the information for that font is not in the memory already, the housekeeping part of the program then determines if there is enough room in the memories 166 and 170 for the new information. If so, the new information simply is read into memory. If not, then the oldest used font or fonts are destructively read out of the memory and the information for the new font is read in in its place. It should be understood, or course, that the readout from the disk file 24 is non-destructive.

The memory 170 stores stroking data for a minimum of one font, and, in many cases, more than one font. Data for up to four fonts are stored in the font memory tables.

Another housekeeping function which is performed is to display on the control panel all the display messages pursuant to the display instruction on the input tape. (See Table I above).

A "run" switch (not shown) is provided on the machine. It is a three-position switch. When it is in the run position, the machine is adapted to perform type composition. A second position is a "continuous search" position in which machine searches continuously to find display messages in the input tape. It reads the information in bit positions 5 through 16 (Table I), converts that information to a number, and displays it on the control panel 20. It then continues to the next display message and to the next until it reaches the end of the tape. Preferably, the display messages give the page numbers of the data being read from the input tape.

ing data; that is, the data used in forming the strokes for each character. Table II below sets forth this code structure.

TABLE II

| COMMAND STRUCTURE | STROKING DATA CODE STRUCTURE | |
|---|---|---|
| | DATA STRUCTURE | DESCRIPTION |
| (A) 000 | | Start and Stop command; always followed by 21 bits of data. Data defines coordinates at which a stroke segment stops and starts. |
| | SXX | "S" is the sign bit indicating whether the next change in the start coordinate will be positive |
| | XXX | or negative. A "O" means positive, a"1"means negative. The next 9 "X"'s are bits defining the start coordinate, a number from 1 to 511. |
| | XS'Y | "S'" is the sign bit for the stop coordinate |
| | YYY | The next 9 "Y"'s are bits defining the stop coordinate for the segment. |
| | YYY | "Z" is a bit which indicates whether there are any more segments in that |
| | YYZ | stroke; a"0" indicates there are no more; a"1" indicates there is at least one more. |
| (B) 001 | | Add or subtract command; causes a number to be added to or subtracted from the last coordinate. The number can be represented by either two or five bits. |
| | YXX | "Y" indicates whether the number is represented by two or five bits; |
| | (XXX) | a"O" means five bits,"1" means two bits. The "X"'s represent the bits defining the number to be added or subtracted. |
| (C) 010 | XXX | Hold data command; causes the 6-bit number represented by the X's to be |
| | XXX | stored; applies to no fire, hold start or stop and hold increment commands. |
| (D) 001 | | Hold start or stop; holds the corresponding coordinate the same as it was in the previous stroke. Can be used only once. |
| (E) 100 | 3 Bits | Hold increment or decrement; holds the increment or decrement in a particular start or stop the same as it was in the previous stroke. |
| (F) 101 | 3 Bits | End of character. |
| (G) 110 | 3 Bits | Multiple start flag; precedes each stroke in which there is a change in the number of starts and stops, thus indicating a change in the number of segments in that stroke. |
| (H) 111 | 3 Bits | No fire; causes laser to be blanked for the entire stroke. |

The run switch has a third position, the "single search" position, in which the reading of the tape halts as soon as a new page number has been located.

Another housekeeping function is the reading of each block (768 words) of information from the tape into the input buffer 167 (see FIG. 5).

Finally, the housekeeping program also detects the 5th, 6th, and 7th bits of the font change code to determine whether the text is to be set in full aperture, text aperture, or split aperture. The computer which produces the input tape scans each line of composition to determine which of the three modes is to be used, and then puts this information in the tape.

The housekeeping program and the program used to drive the computer to prepare an input tape having the data shown in Table I will not be described in any greater detail for the reason that they are conventional and readily available. For example, suitable programs are available from the Digital Equipment Corporation.

b. Forming Characters

It is helpful to an understanding of the character formation process to know the code structure for the strok- In order to give a more complete understanding of the code structure and how it is related to the control of the laser beam in forming a character, an example will be given describing the formation of a capital letter A in a type face named "Crown 381" in 6 point size. It should be understood that the term font, as used in this description, means a group of characters, including upper case and lower case characters as well as numerals, etc., in a single style or type face, and in a single size. If either the style or the size is changed, then a new font must be selected and its data must be used.

Figure 6:
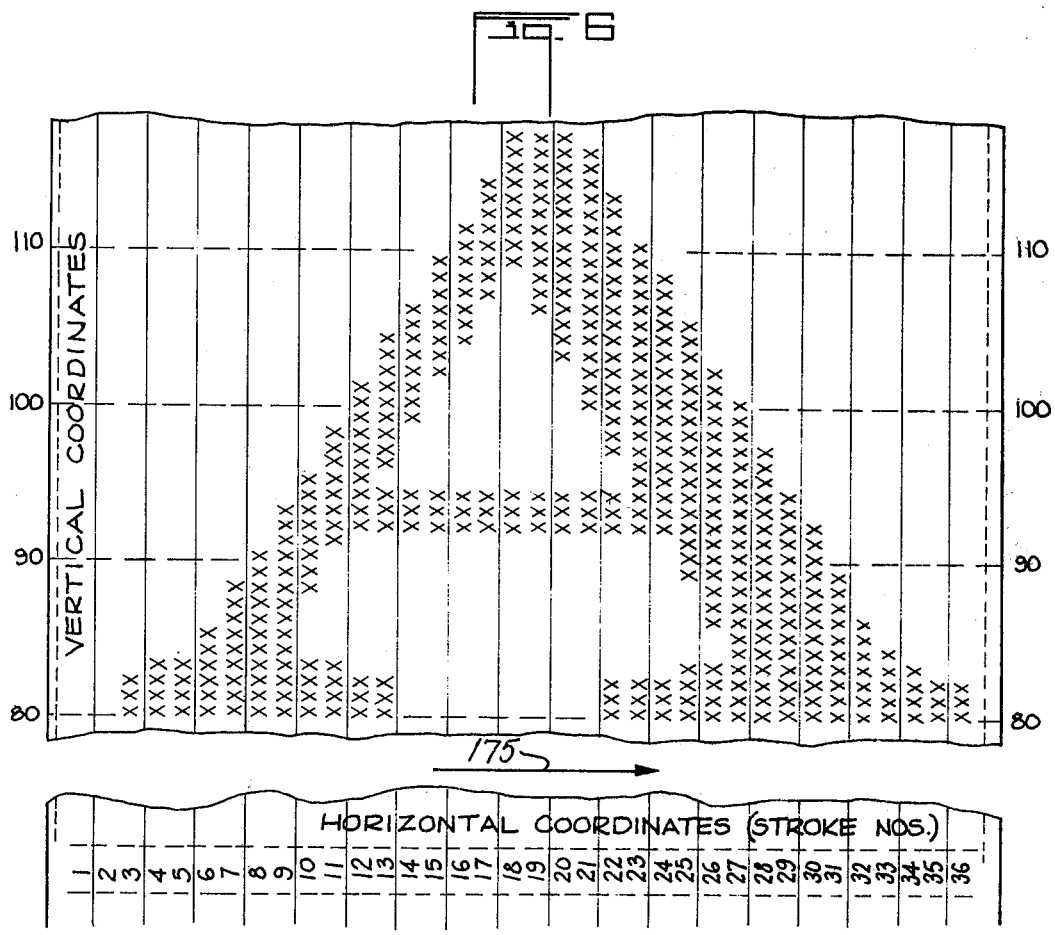
FIG. 6 is an enlarged representation of a character formed by the machine and method of the invention.

FIG. 6 is an enlarged representation of the capital letter A in Crown 381 6 point, as it would appear if it has been formed as a computer printout. Each of the X's forming the character locates the coordinate of a round laser spot on the film. Each of the X's is located at the point of intersection between a numbered vertical coordinate line and a numbered horizontal coordinate line. Actually, the vertical columns formed by the X's will appear to be a solid line on the film, and the end of each such line will be rounded because the laser beam shape is round.

The horizontal scanning device 60 (FIG. 2) moves the laser beam horizontally in the direction indicated by the arrow 175 in FIG. 6; that is, composition proceeds from left to right. Part of the maximum scan area of the laser beam has been excised from FIG. 6 in order to save space in the drawings.

Table III below lists the stroking data used in forming the character shown in FIG. 6.

TABLE III

| STROKE | CODE | |
|---|---|---|
| 1 | 111 | No Fire |
| 2 | 111 | No Fire |
| 3 | 000 (SXX) | Start Segment at 80 Sign bit is + |
|   | 000 (XXX) | Stop Segment at 83 Sign bit is + |
|   | 001 (XXX) | |
|   | 010 (XSY) | |
|   | 001 (YYY) | |
|   | 100 (YYY) | |
|   | 101 (YYZ) | |
|   | 001 | "1" in Z position indicates no more stops or starts in the stroke. |
| 4 | 011 | Hold Start |
|   | 001 | Add 1 to last coordinate |
|   | 110 | |
| 5 | 011 | Hold Start |
|   | 011 | Hold Stop |
| 6 | 011 | Hold Start |
|   | 001 | Add 2 |
|   | 101 | |
| 7 | 011 | Hold Start |
|   | 001 | Add 3 |
|   | 111 | |
| 8 | 011 | Hold Start |
|   | 001 | Add 2 |
|   | 101 | |
| 9 | 011 | Hold Start |
|   | 001 | Add 3 |
|   | 111 | |
| 10 | 110 | Multiple Start Flag (Needed to reset segment register) |
|   | 000 | Start 80+ |
|   | 000 | Stop 84− |
|   | 001 | |
|   | 010 | |
|   | 010 | |
|   | 010 | |
|   | 101 | |
|   | 000 | 0 in Z position means there is another segment in this stroke |
|   | 000 | Start 88+ |
|   | 000 | Stop 96+ |
|   | 011 | |
|   | 010 | |
|   | 000 | |
|   | 000 | |
|   | 001 | |
|   | 001 | |
| 11 | | |
|   | 011 | Hold Start ⎫ First |
|   | 011 | Hold Stop ⎭ Segment |
|   | 001 | Add 3 to start of 2nd Segment |
|   | 111 | |
|   | 001 | Add 3 to end of 2nd Segment |
|   | 111 | |
| 12 | 011 | Hold Start |
|   | 001 | Subtract 1 |
|   | 110 | |
|   | 001 | Add 1 to start of 2nd Segment |
|   | 110 | |
|   | 100 | Hold Increment (+3) at end of 2nd Segment |
| 13 | 110 | Flag |
|   | 011 | Hold Start |
|   | 011 | Hold Stop |
|   | 000 | Start 92+ |
|   | 000 | Stop 95+ |
|   | 111 | |
|   | 010 | |
|   | 001 | |
|   | 111 | |
|   | 101 | |
|   | 000 | |
|   | 000 | Start 96+ |
|   | 000 | Stop 105+ |
|   | 000 | |
|   | 110 | |
|   | 001 | |
|   | 001 | |
|   | 011 | |
|   | 001 | |
| 14 | 110 | Flag |
|   | 000 | Start 92+ |
|   | 000 | Stop 95+ |
|   | 111 | |
|   | 010 | |
|   | 001 | |
|   | 111 | |
|   | 101 | |
|   | 000 | |
|   | 000 | Start 99+ |
|   | 011 | Stop 107+ |
|   | 000 | |
|   | 110 | |
|   | 001 | |
|   | 101 | |
|   | 011 | |
|   | 001 | |
| 15 | 011 | Hold Start |
|   | 011 | Hold Stop |
|   | 001 | Add 3 to start of 2nd Segment |
|   | 111 | |
|   | 001 | Add 3 to end of 2nd Segment |
|   | 111 | |
| 16 | 011 | Hold Start |
|   | 011 | Hold Stop |
|   | 001 ⎫ | Add 2 to start of 2nd Segment |
|   | 101 ⎭ | |
|   | 001 ⎫ | Add 2 to end of 2nd Segment |
|   | 101 ⎭ | |
| 17 | 011 | Hold Start |
|   | 011 | Hold Stop |
|   | 001 | Add 3 |
|   | 111 | |
|   | 001 | Add 3 |
|   | 111 | |
| 18 | 011 | Hold Start |
|   | 011 | Hold Stop |
|   | 001 | Add 2 |
|   | 101 | |
|   | 100 | Hold Increment at end of 2nd Segment |
| 19 | 011 | Hold Start |
|   | 011 | Hold Stop |
|   | 000 | Start 106− |
|   | 001 | Stop 117− |
|   | 110 | |
|   | 110 | |
|   | 011 | |
|   | 010 | |
|   | 111 | |
|   | 001 | |
| 20 | 011 | Hold Start |
|   | 011 | Hold Stop |
|   | 001 ⎤ | Subtract 3 from start of 2nd Segment |
|   | 111 ⎦ | |
|   | 011 | Hold Stop |
| 21 | 011 | Hold Start |
|   | 011 | Hold Stop |
|   | 100 | Hold Increment at start of 2nd Segment |
|   | 001 | Subtract 1 from end of 2nd Segment |
|   | 110 | |
| 22 | 110 | Flag |
|   | 000 | Start 80+ |
|   | 000 | Stop 83+ |
|   | 001 | |
|   | 010 | |
|   | 001 | |
|   | 100 | |
|   | 101 | |
|   | 000 | |
|   | 000 | Start 92+ |
|   | 000 | Stop 95+ |
|   | 111 | |
|   | 010 | |
|   | 001 | |
|   | 111 | |
|   | 101 | |
|   | 000 | |

TABLE III-continued

| STROKE | CODE | |
|---|---|---|
| | 000 | Start 97+ |
| | 010 | Stop 114 |
| | 000 | |
| | 110 | |
| | 000 | |
| | 100 | |
| | 111 | |
| | 001 | |
| 23 | 110 | Flag |
| | 011 | Hold Start |
| | 011 | Hold Stop |
| | 000 | Start 92− |
| | 100 | Stop 110 |
| | 111 | |
| | 011 | |
| | 010 | |
| | 010 | |
| | 011 | |
| | 001 | |
| 24 | 011 | Hold Start |
| | 011 | Hold Stop |
| | 011 | Hold Start Stop |
| | | Subtract 2 from start of 2nd Segment |
| | 001 ⎤ | |
| | 010 ⎦ | |
| 25 | 011 | Hold Start |
| | 001 | Add 1 to Stop Coordinate |
| | 110 | |
| | 001 | Subtract 3 from Start of 2nd Segment |
| | 111 | |
| | 001 | Subtract 3 from end |
| | 111 | |
| 26 | 011 | Hold Start |
| | 011 | Hold Stop |
| | 100 | Hold Increment |
| | 100 | Hold Increment |
| 27 | 110 | Flag |
| | 000 | Start 80+ |
| | 000 | Stop 101− |
| | 001 | |
| | 010 | |
| | 011 | |
| | 010 | |
| | 011 | |
| | 001 | |
| 28 | 011 | Hold Start |
| | 001 | Subtract 3 from stop of Segment |
| | 111 | |
| 29 | 011 | Hold Start |
| | 100 | Hold Increment |
| 30 | 011 | Hold Start |
| | 001 | Subtract 2 |
| | 101 | |
| 31 | 011 | Hold Start - Stop |
| | 001 | Subtract 3 |
| | 111 | |
| 32 | 011 | Hold Start |
| | 100 | Hold Increment |
| 33 | 011 | Hold Start |
| | 011 | Subtract 2 |
| | 101 | |
| 34 | 011 | Hold Start - Stop |
| | 001 | Subtract 1 |
| | 110 | |
| 35 | 011 | Hold Start - Stop |
| | 100 | Hold Increment |
| 36 | 011 | Hold Start |
| | 011 | Hold Stop |
| | 101 | End of Character Command |

The base line of the character is the vertical coordinate 80. In Table III, it can be seen that the stroke number corresponds to the horizontal coordinate in FIG. 6. This is coincidental and is true only because, in this example, the character "A" which is being composed in the first character in a line of type composition.

Still referring to Table III, it can be seen that the character does not start until the third horizontal coordinate or stroke. Therefore, the first two codes are "no-fire" codes which cause the laser beam to be blanked for the first two strokes.

During stroke three, the formation of the character starts. Therefore, a start and stop code (000) is read out of the character shape memory 170 (FIG. 3). In Table III the letters from Table II have been inserted above the data following the start and stop command.

The "S" bit is 0, indicating that the next change in the start coordinate in positive. The reason for this is that, as it can be seen in FIG. 6, the start coordinate stays the same until stroke number 14, at which point it increases for the first time.

The next nine bits in Table III, stroke 3, represent the number 80, the coordinate at which the laser beam is turned on. The $S^1$ bit is 0, indicating that the next change in the stop coordinate will be positive.

The next change in the stop coordinate occurs in FIG. 6 during the next stroke, stroke number 4. The 1 in the Z position indicates that there are no more stops or starts in this stroke; in other words the laser beam need write no more during this stroke.

For stroke number 4, the start coordinate remains the same and the stop coordinate increases by one. Instead of totally re-defining the stop and start segments by use of 21 bits of data as in stroke number 3, the data is compressed by conventional data compression techniques. Thus, a "hold stop or start" code is used to keep the start coordinate the same. Next, instead of re-defining the stop coordinate, an instruction is given to add one to the last coordinate. The first three bits identify the command, the fourth bit indicates that the number to be added consists of only two bits, and the final two bits represent the number, in this case one.

Stroke number 5 is identical to stroke number 4. Therefore, the data read out of memory to control stroke number 5 consists merely of two "hold start or stop" signals in succession.

In stroke numbers 6 through 13, the start coordinate remains the same. Therefore the starting coordinate is kept the same merely by the use of hold start codes at the beginning of each stroke, except for strokes 10 and 13 in which a different procedure is required because of the change in the number of segments in those strokes. In strokes 6 through 9, "add" commands are used to increment the stop coordinate by appropriate amounts.

In stroke 10, the number of segments in the stroke increases from one to two, and this makes it necessary to re-define the starting and stopping coordinates. This is necessary because at the beginning of stroke 10 a multiple start flag must be inserted in order to ensure that the control circuits shown in FIG. 3 operate properly. In FIG. 6, it can be seen that the first segment (the lower one) in stroke 10 starts at coordinate 80 and ends at coordinate 84. Thus, the start and stop signal is read out, together with data defining the start coordinate as 80 and the stop coordinate as 84. The plus sign next the number 80 in Table II indicates that the next change in the start coordinate is positive. However, the next change in the stop coordinate is negative (in stroke 12) so the stop sign is negative in Table III. There is a 0 in the Z position which indicates that there is another segment in the stroke.

The second segment of stroke 10 starts at coordinate 88 and ends at coordinate 96. This segment is defined in the same way as the first segment in the stroke. The plus signs for the stop and start coordinates indicate that the next changes in the coordinates are positive. A 1 in the Z position indicates that there are no more segments in this stroke.

In stroke 11, the first segment is identical to the first segment of the previous stroke. Therefore, the data for stroke 11 starts out with two hold start or stop signals.

Then, three is added to each of the coordinates of the second segment.

In stroke 12, the start coordinate for the first segment is held, but one is subtracted from the stop coordinate. One is added to the start of the second segment, and a "hold increment" command is used to hold the amount the stop coordinate was incremented during the previous stroke. This saves three to six bits of data and thus reduces the demand on memory capacity in the memory 170. Stroke 13 has three segments instead of the two in stroke 12. Therefore, a flag command starts the data for stroke 13. The first segment is identical to the previous first segment, so it is defined by two hold start or stop signals. The second segment is defined by a start and stop command together with data identifying coordinates 92 and 95. A 1 in the Z position indicates that there is another segment to come. The third and last segment is defined in the same manner as the second segment.

In stroke 14 the number of segments changes back to two. Therefore, a flag bit starts the data for stroke 14. FIG. 6 shows that the new first segment starts at coordinate 92 and stops at coordinate 95. Therefore, the first segment is defined by means of a start and stop signal and a full set of data. The second segment also is defined by a full set of data.

Strokes 15 through 18 are defined simply by the use of hold start and hold stop signals and add signals. It is to be remembered that the "add" signals actually are addition or subtraction signals. The are identified as add signals in defining strokes 15 through 18 because the increment signs set up during stroke 14 were all positive. Had they been negative, the add signal would have been a subtraction signal. In stroke 18 a hold increment signal is used to maintain the increment from the previous stroke.

In stroke 19 the coordinates must be defined completely again because there is a change in the increment sign in that in stroke 20 the start coordinate starts decreasing instead of increasing. The sign for the stop signal also becomes negative because the next change is a decrease in that coordinate.

Strokes 20 an 21 are encoded by the use of hold start and hold stop and add and hold increment signals.

In stroke 22, the number of segments changes to three, and so a flag bit starts out the information. Each of the three segments is defined completely.

In stroke 23 the number of strokes changes again, and another flag command is used.

In view of the foregoing explanation, the codes used for the remaining strokes can be ascertained readily from Table III. At the end of the last stroke, stroke number 36, an "end of character" command appears to signal that composition of the character now is complete.

The methods and techniques used in encoding the stroking data for each character include the use of a flying-spot scanner to scan large master characters and encode the black and white areas forming the characters. Then the data is processed by a computer program which performs the data compression and puts the data in the form indicated in Tables II and III. These procedures are very similar to those used in encoding characters for use in CRT photocomposers. They are well known and will not be described in detail here. The methods very closely follow those described in the publication entitled "Coding Processes for Bandwidth Reduction in Picture Transmission" by A. E. Laemmel, report R. 246–51, PIB-187 U.S. Government Contract No. W28-099-ac-481. Accession number U53062 at the Lincoln Laboratory at Massachusetts Institute of Technology, dated Aug. 30, 1951.

The operation of the character control circuit in the composition of characters now will be explained.

CHARACTER CONTROL CIRCUIT OPERATION

In the formation of characters, the formation of each vertical stroke has two phases; a definition phase and a writing phase. During the definition phase the character control circuit 150 (FIG. 3) is given the data it needs and otherwise is prepared for the writing stroke, and then the actual writing or movement of the laser beam across the surface of the film takes place.

1. Definition Phase

Prior to the definition phase for any character, the font identification information has been read from the magnetic tape and the necessary font data has been stored in the memories 166 and 170 (see FIG. 3). To start the definition phase the CPU delivers a signal over a line 157 * to a memory address register 168 which addresses the first address of the portion of the memory 170 which contains the stroke information for that character, and reads that information into a shift register 172. The CPU also delivers through a line 209 to a horizontal position counter 210 data indicating the starting address and number of strokes (width) for the character to be composed.

* It should be understood throughout the description herein that a "line" such as line 157 and others to be described below can consist of one conductor or many more than one conductor. The actual number of conductors in a given line depends upon the specific types of circuit components, memories and addressing logic used, and will be readily apparent to one of ordinary skill in the art.

The information is shifted out of the shift register 172 by a shift control circuit which is operated by a hardwire sequencer 177 under the control of commands which are decoded by a decoder 176. The shift control circuit 174 also sends a signal over a line 175 to the memory address register 168 to cause more stroking data to be read from the memory 170 into the shift register 172, once for every 12, bits of data.

From the foregoing discussion regarding character processing, it is evident that for each vertical stroke there is provided information indicating the number of segments in that stroke; that is, the number of times the laser beam is to be turned off (blanked) and turned on. This number is transmitted over a line 199 to a segment register 200 for temporary storage. Also, for each stroke there is transmitted from register 172 over line 179 and stored in a scratch pad memory 178 the following information: in section 182, the start and stop coordinates for each segment of the stroke; in section 184, the sign of the next change of the start or stop coordinate; and in section 186, the amount of the increment or decrement in the coordinate. Section 180 of the memory 178 contains the addressing logic for the memory. The stop/start and the increment data is transmitted through a multiplexer 195 to an arithmetic logic unit 188 which increments or decrements the stop/start data to provide correct stop/start coordinates for the next stroke.

A selection counter 198 counts signals received from the shift control circuit 174 through an OR gate 206. A segment comparator 194 compares the count on the selection counter with that in the segment register, and indicates that a stroke has been completed when the two counts are the same. A reset signal for the counter 198 is received through the OR gate 206 over a line 193.

The segment register 200 holds its data until a Multiple Start Flag signal (e.g. see stroke 10, Table III above) resets the register. Then new data representing the number of segments in the next stroke is read into the register 200.

The output of the segment comparator 194 is delivered to a hold circuit 196 which is a flip-flop which prevents the shift control circuit 174 from causing shifting until after the writing phase has been completed and the next stroke is to be defined.

The horizontal position indicator circuit 76 continuously delivers timing pulses to the horizontal position counter 210 over line 205 and branch 207, and to a vertical position counter 192 over line 205 and branch 214. Each timing pulse signals the start of the writing phase of operation.

2. The Writing Phase

The signal on line 214 which starts the writing phase enables the vertical position counter 192 to start counting pulses from a high-frequency clock source 197 whose output is synchronized with that of the horizontal position indicator 76 by means of a conventional phase-locked loop which is indicated schematically at 213.

The start signal also starts another counter 179 which counts clock pulses from source 197 and is used to drive the vertical sweep modulator 58 (see FIg. 2 as well as FIG. 3). The output of counter 179 is converted by a digital-to-analog ("D/A") converter 181 into a stair-step ramp voltage which is fed to a voltage-controlled-oscillator ("VCO") 183 whose output frequency changes with each step of the output from VCO 183. Each change of the frequency of the VCO output shifts the vertical position of the laser beam by a small amount. This scans the laser beam vertically.

FIG. 7 is a waveform diagram of the key operative signals used in composing a line of characters. The time base for the waveforms extends over one full line of characters, but the waves are broken in order to be able to fit them onto the drawing sheet.

The "system ready" signal 216; the "horizontal ready" signal 218' and the "horizontal start" signal 220 are developed by the CPU 164, when the machine is ready (the horizontal retrace step is complete, etc.) to compose a line. The horizontal start signal 220 is delivered over line 215 (FIG. 3) to the laser horizontal deflector 60. This starts the mirror 62 (FIG. 2) moving. A steady d.c. signal is applied to the deflector motor. After the mirror has reached a steady speed, the position indicating laser beam 72 (FIG. 2) first passes one of the grating lines 75, which causes the the position indicating circuit 76 to emit the first vertical start pulse 222 (FIG. 7). The stepped output signal 226 of the VCO 183 (FIG. 3) which results has one step for every clock pulse 230. Only a few of the steps are shown in FIG. 7 due to space limitations in the drawings.

When the counter 179 (FIG. 3) has counted up to a count of 193, it develops an output signal 232 (FIG. 7) on line 212 (FIG. 3) which disables and resets the vertical position counter 192, and resets a vertical stroke busy flip-flop 204, thus enabling the shift control circuit 174 to start the definition phase for the next stroke. The flip-flop 204 is set by a signal from either the hold circuit 196 or a vertical start pulse on line 214 to disable the shift control circuit 174 and sequencer 177 and disable the definition circuitry until the time for the next definition phase arrives.

Referring again to FIG. 7, pulses 236 and 238 are "unblanking" signals which turn the laser beam on for certain numbers of clock cycles to form two typical segments of a single vertical stroke of the laser beam. The blanking and unblanking of the laser beam occurs as follows.

The vertical position counter counts clock pulses delivered from clock source 197 starting as soon as the start pulse is received on line 214. Simultaneously, the start and stop coordinate data is delivered from scratch-pad memory 178 over line 217 to the comparator 190, which also receives the output of the counter 192. Whenever the count from counter 192 matches the data on line 217, the comparator 190 delivers a signal to the "blanking" flip-flop 202 to change its output state, thus actuating the blanking modulator 86 and turning the laser beam on and off to form the stroke segments. During any one stroke, the number of changes of state by the flip-flop 202 always in an even number. The output state of the flip-flop 202 normally is such as to cause the blanking modulator 86 to blank the laser beam. The even number of changes of state ensures that the beam will be blanked at the end of each stroke, during retrace, and at the start of the next stroke. Every output pulse from the comparator 190 is delivered to the input of the selection counter which then addresses the data defining the next coordinate, which is read out over line 217.

At the end of the first stroke described above there is a short time period 242 before the occurrence of the next vertical stroke starting pulse 224. It is during this time period, sometimes referred to as "cooking time," that the laser beam retraces to its starting position (due to the sharp drop of the output from the VCO), and the definition of the next stroke takes place. Then a new stepped wave 228 is generated by the VCO, a stop pulse 234 occurs, and another laser stroke has been developed. This process continues many times for each character, and many more times for a whole line of characters, until the CPU develops a horizontal retrace pulse 240 which is delivered over line 215 to the horizontal deflector 60 to cause it to return the deflection mirror to its starting position.

Referring again to FIG. 3, as it was pointed out above, the CPU 164 stores the number of strokes in a given character in the horizontal position counter 210. When the character has been completed, the counter 210 overflows and sends an "end character" signal to the CPU over a line 211. This causes the CPU to address the data in memory 170 for the next character, and to store the number of strokes in counter 210 for the next character.

FULL APERTURE MODE

The foregoing description is of the "text mode" or high-speed mode of operation, which is used only when all characters in a line are at or below a certain point size, such as 10 points. When any character in a line is over that size limit, composition proceeds in the full-aperture mode. In this mode, the signal delivered over line 215 (FIG. 3) to the horizontal deflector 60 is changed so as to slow the deflection speed. Simultaneously, the count set into the counter 179 by the CPU over line 219 is increased so that the length of each vertical stroke is increased. The change in the speed of the deflector 60 is inversely proportional to the change in the stroke length.

If desired, the horizontal deflection speed and the stroke length can be set at various different levels to enable the machine to compose at a speed inversely proportional to the point size of the characters.

OVERSIZED CHARACTERS

Characters over a maximum point size are composed during two different horizontal scans; the stroking data for each half of a character is stored as if it were data for a whole character, and the two halves of each character are joined during successive horizontal scans.

CIRCUIT COMPONENTS

The character shape memory 170 preferably is a relatively high-speed memory formed of static semiconductor MOS memory chips. For example 192 chips of the 2102 designation can be used to provide the 16 K by 12 storage capacity specified.

The speed of operation of the sequencer 177 should be as high as possible. A design which is suitably fast uses nine Schottky semiconductor shift register chips with parallel loading. The chips are designated No. 74S195.

Elsewhere in the circuit of the machine, standard TTL (transistor-transistor logic) circuitry is used.

The CPU 164, central memory 166 and I/O control 162 can be a standard mircoprogrammable controller, as is well known in the art for driving a phototypesetter such as the "Pacesetter" equipment sold by Photon, Inc.

HYPHENATION AND JUSTIFICATION

If it is desired to operate the machine 10 in other than a slave mode, additional capacity for the central memory 166 and other hardware must be provided so that the machine can provide hyphenation and justification computations, and stroking and other data such as that shown in Table I above. This hardware and the software to drive it are well known and widely used in the art and will not be described in detail.

PREFERRED EMBODIMENT

FIG. 4 of the drawings shows the peferred photocomposing machine 10' of the present invention. The machine 10' has a different housing 12' and control panel 20', and a paper tape reader 23. The other major components are the same as in the machine 10 shown in FIG. 1. A magnetic tape reader can be used instead of the paper tape reader 23, if desired. Certain of the features of the machine 10' are different from those described above, and the latter features will be described below.

FIGS. 8 through 11 show the preferred optical system 300 for the machine 10' of the present invention.

Referring first to FIG. 8, which is a plan view of the optical system 300, components which are the same as those shown in FIG. 2 are given the same reference numerals.

The laser source 50 reflects the "write" beam 52 off of mirrors 310 and 312 through blanking modulator assembly 56, a collimator 302, and is reflected off of a mirror 304 to the vertical modulator 58.

The beam from the vertical modulator assembly 58 goes through a beam splitter 316 to a collimator 318 and thence to the rotary scan mirror 62. The images from the mirror 62 are projected through the scan lens 64 and onto the mirror 66 from which it is reflected upwardly to the photographic paper or film 54 (see FIG. 9).

The "sense" beam 72 is taken from the back end 306 of the laser source 50. It is reflected from the beam splitter 70 towards a mirror 308, through a collimator 314, and against the beam splitter 316, which reflects the sense beam through the collimator 318 and against the scan mirror 62. The mirrors in the system are tilted slightly to bend the laser beams upwardly to compensate for differences in the heights of the components of the system.

Referring to FIG. 9 (which shows only the last portion of the system of FIG. 8), the sense beam is reflected from the scan mirror 62 at a slight angle above the write beam 52 so that the sense beam 72 passes over the mirror 66 and on to a grating device 320. A photo-electric detector 322 (see FIG. 8) is positioned opposite one end 328 of the grating device.

FIG. 11 is a schematic perspective drawing of the grating device 320. The grating device consists of an elongated rectangular bar of quartz with closely-spaced opaque lines 324 forming a reticule. The spaces between the lines 324 admit light into the quartz bar, but the lines block the light, thus forming light pulses as the laser beam 72 scans across the bar. The lines 324 are drawn much farther apart than they actually are spaced, for the sake of clarity of the drawing.

All surfaces of the quartz bar are ground flat, and all, except the front surface 326 bearing the lines 324 and the end 328, are coated with reflective aluminum by a known vapor-coating process. When the light from the beam 72 enters the quartz bar, it is reflected along a multitude of different paths, indicated by dashed lines 330, and some of the light escapes from the uncoated end 328 in various directions indicated by the arrows 332. The escaping light is detected by the photo-electric detector 322 (FIG. 8), thus converting the light pulse into an electrical pulse. This process is repeated each time the laser beam passes over a clear area between two of the lines 324. The electrical pulses are modified and used to provide timing signals in the same manner as in the embodiment of the invention which is shown in FIG. 3.

If the intensity of light reaching the one end 328 of the bar is not sufficient at all positions of the beam 72 along the bar, another photo detector can be added at the opposite end of the bar (which would be left without an aluminum coating), and the signals from both photo detectors can be added to give a greater signal.

The grating device 320 preferably is relatively long, e.g. 17 inches, the width of a full newspaper page. Thus, the sense beam 72 moves from one extreme position 334 to another extreme position 336 as the mirror 62 swings from its most extreme position to the other. This causes the sense beam to traverse the full span of the grating device. The ability to compose a full width of a newspaper page at one pass is a decided advantage.

The device 76 shown in FIG. 2 uses a long, continuous photo-sensitive semi-conductor element to detect the light pulses as they pass through the grating and strike the photo-detector while sense beam 72 moves along the grating. Such a photo-detector is relatively expensive, even for moderate lengths. In order to provide a photo-detector of a length sufficient to span the full 17 inch width of the grating 74 shown in FIG. 2, at least two photo-detectors have to be joined end-to-end, with technology presently available, and this adds further expense. In contrast, the system shown in FIGS. 8 through 11 utilizes only a single small, relatively inexpensive photo-detector 326 and a more modestly-priced grating device 320 to perform the same function. In fact, the line length (i.e. the length of the grating) can be increased even beyond 17 inches, if desired, without an inordinate increase in cost.

In the system shown in FIGS. 8 through 10, the blanking modulator assembly 56 consists of an Isomet Model B-30075 modulator with an aperture plate, as in FIG. 2. The mirrors 304, 308, 310 and 312 are conventional. Each mirror is, for example, an Isomet Model C-30064 mirror.

Referring now to FIG. 10, the scan lens 64 is a three-element field-flattening lens including a plano-concave front element 338, a plano-convex middle element, and a double-concave rear element 342. A suitable lens is the Isomet Model B-10013A lens.

The collimator 318 includes a double-concave front element 344, a plano-convex element 346, an aperture plate 348 to reduce the divergence of the beam, a double convex lens 350 and a double-concave lens 352.

The vertical modulator 58 is a special adaption including two Isomet Model LD 400 deflectors 356 and 360, and two polarizer plates 354 and 358. The two laser deflectors 356 and 360 operate together to correct non-linearities one deflector would have alone, and to extend the extent of the vertical sweep of the laser beam. The purpose of the plates 354 and 358 is to convert the laser beams received by them into right-hand circularly-polarized energy which is required by the LD 400 deflectors.

The beam splitter 316 preferably is a Model 63 laser source made by American Laser Corporation.

The disk file 24 preferably is a Diablo Model 31. The magnetic tape reader preferably is a model 9000 made by The Kennedy Co.

The grating 74 (FIG. 2) preferably is an Isomet Model B 20007.

The photo-detector 322 preferably is a Model TIN-25 made by United Detector Technology Corporation.

The laser source 50 described above should have a power output level as high as possible in order to enable the laser beam to expose a pre-sensitized lithographic plate directly. For example, an Argon laser source producing 12 watts output power now is available; e.g. the Model 912 made by Control laser Corporation. With such a device, certain lithographic plates can be exposed directly, although at present the speed of composition would have to be lowered considerably. For example, it is believed that a 12 watt laser source could be used to expose a type L photo resist plate made by Horizons in about 5 to 10 minutes. Such a plate uses known photo resist techniques similar to those used in the semiconductor industry. The photo resist material which is exposed to the laser beam is changed chemically so that when the plate is washed in a chemical etchant, the exposed material is not removed whereas the remainder is etched away. This process can be used to produce lithographic plates or relief plates, depending upon when the laser is on during composition of the character. With even higher powered laser sources and/or slower composing speeds, relief printing plates can be composed directly by evaporating or ablating a thin film of metal from specific areas of a plastic-backed plate such as the plates made by the Gannett Corporation. Also, at higher power levels it is believed that it will be possible to expose diazo and photo polymer type plates.

The above description of the invention is intended to be illustrative and not limiting. Various changes or modifications in the embodiments described may occur to those skilled in the art and these can be made without departing from the spirit or scope of the invention.

I claim:

1. A photocomposing device comprising, in combination, a laser source for producing a laser beam, first deflection means for moving said beam in a first direction lengthwise of a line of characters to be composed, second deflection means for moving said beam rapidly back and forth in a second direction which is transverse to said first direction, projection means for projecting said beam onto a photo-sensitive surface, and blanking means for substantially completely blocking the transmission of said beam at selected times to form images of characters and space them proportionally on said photo-sensitive surface.

2. A device as in claim 1 including detecting means for detecting and developing a signal indicating the position of said laser beam relative to said photo-sensitive surface, and means for controlling the timing of said second deflection means in accordance with said signal.

3. A device as in claim 2 in which said detecting means includes holding means for holding said photo-sensitive surface, sensor means located adjacent and in fixed relation to said holding means, and means for projecting a portion of said laser beam onto said sensor means.

4. A device as in claim 1 including an optical reticle adjacent said photosensitive surface, means for projecting radiant energy from said beam onto said reticle, photo-electric means positioned to receive radiant energy from by said reticle and adapted to produce a signal precisely indicating the relative position of said laser beam, and control means for controlling the operation of said second deflection means in accordance with said signal.

5. A device as in claim 4 in which signal comprises a series of pulses, one for each line forming said reticle, and means for producing additional pulses of even time spacing between adjacent pulses.

6. A device as in claim 1 in which said blanking means includes opaque barrier means adjacent the optical path of said beam, and further deflecting means for deflecting said beam out of said path and against said barrier means prior to said beam reaching said photosensitive surface.

7. A device as in claim 5 in which the last-named deflecting means comprises a refractive member in said optical path, and means for producing high-frequency oscillatory pressure waves in said member.

8. A device as in claim 1 including means for detecting the height of said characters and adjusting, in inverse relationship to one another, the scan distance of said second deflection means and the speed of deflection of said first deflection means.

9. A device as in claim 1 including means for controlling said blanking means in accordance with the widths of characters and proportional spaces of justified lines of characters.

10. A device as in claim 1 in which said photosensitive surface is the surface of a pre-sensitized photolithographic printing plate.

11. A photocomposing device comprising, in combination, a laser source for producing a laser beam, a reversibly rotatable mirror and a drive system for rotating said mirror to deflect said beam in the direction of a line of composition, a vertical stroking deflector for repeatedly scanning said beam over a relatively short distance transverse to said first direction, means for substantially completely blocking the transmission of said laser beam at selected times to cause the scanning movements of said beam to form lines of proportionally-spaced characters on a photo-sensitive surface, reticle means located in fixed relationship to said surface, means for separating out a portion of said laser beam, guide means for vertically aligning said portion with the modulated beam inpinging upon said rotatable mirror, and separating said beam portion from the modulated beam so that said beam portion remains vertically aligned with said modulated beam after deflection by said rotatable mirror.

12. A photocomposition method comprising the steps of generating a thin laser beam, projecting said laser beam onto a photo-sensitive surface while moving the beam linearly in the direction of a line of characters, and transversely to the first-named direction at a relatively greater speed with oscillatory motions, and substantially completely blocking the transmission of the beam at pre-determined times to form and proportionally space character images on said surface.

13. A method as in claim 12 including the step of detecting said laser beam and producing a plurality of pulses indicating the position of said laser beam relative to said photo-sensitive surface, and using said pulses to control the start of said oscilliatory motions.

14. A photocomposing device comprising, in combination, a laser source for producing a laxer beam, sweep means for sweeping said beam in a linear path in the direction of a line of characters to be composed, scanning means for simultaneously and rapidly scanning said beam back and forth in a second direction transverse to the first-named direction, modulating means for modulating the intensity of said beam in accordance with a pre-determined pattern in order to cause said laser beam to form character images on a photosensitive surface, means for detecting the height of said characters in said line, means for varying the scanning distance of said beam directly with said height, and means for varying the speed of sweeping said beam inversely with said height.

15. A device as in claim 14 in which said modulating means comprises barrier means, deflection means for selectively deflecting said beam against said barrier to substantially block its transmission.

16. A device as in claim 14 in which said sweep means includes a deflection means for deflecting said beam by bending it through a variable angle, drive means to drive said deflection means to vary said angle during composition of a line of characters, and retrace means for rapidly returning said deflection means to a start position to start another line of composition when the end of thee preceding line has been reached.

17. A device as in claim 16 including means for moving said beam and seid photosensitive surface relative to one another at least partially during the time taken to retrace said beam, in a direction perpendicular to the direction of said line of characters, in order to space lines of characters from one another.

18. A device as in claim 14 in which said scanning means comprises a refractive member in the path of said laser beam, and means for producing high-frequency oscillatory pressury waves in said refractive member.

19. A photocomposition method comprising the steps of providing a laser beam source, moving said beam rapidly back and forth in a first direction to produce a scanning motion in the direction of the height of said characters, moving said beam in a second direction tranverse to said first direction to produce a sweeping motion in the direction of a line of said characters, projecting said beam onto a photosensitive surface while blanking it at pre-determined times to produce lines of proportionally-spaced character images on said surface measuring the height of the characters in a line, varying the extend of said scanning motion directly with said height, and varying the speed of said sweeping motion inversely with said height.

20. A method as in claim 19 in which said scanning extent is uniform in any given line, and said height is the maximum height of any character in said line.

21. A method as in claim 19 in which said sweeping motion is back and forth, and including the step of stopping said motion at the end of a line of characters, regardless of the length of said line, and returning said beam to a starting location for the composition of another line of characters.

22. A photocomposition device comprising, in combination, a laser source for producing a laser beam, first deflection means for sweeping said laser beam across a photosensitive surface in the direction of a line of characters, second deflection means for scanning said beam back and forth in a second direction transverse to the first-named direction at a speed substantially greater than the speed at which said beam is swept by said first deflection means, modulation means for modulating the intensity of said beam during the scanning motion produced by said second deflection means so as to produce and proportionally space character images on said photosensitive surface, said second deflection means comprising a body of refractive material responsive to electrical signals to deflect said beam through varying angles.

23. A device as in claim 22 in which said refractive body includes means responsive to the frequency of said electrical signals for determining the angle of deflection by said refractive material, and means for rapidly changing said frequency in steps to produce said scanning motion.

24. A device as in claim 22 in which said modulation means comprises an opaque barrier to block the transmission of said beam, and means responsive to an electrical signal for deflecting said beam away from said barrier to permit said transmission.

25. A device as in claim 24 in which said deflecting means comprises a body of refractive material responsive to said electrical signal to vary the angle of deflection of said beam.

26. A photocomposing device comprising, in combination, a laser source for producing a laser beam, sweep means for sweeping said beam in a linear path in the direction of a line of characters to be composed, scanning means for simultaneously and rapidly scanning said beam back and forth in a second direction transverse to the first-named direction, modulating means for modulating the intensity of said beam in accordance with a pre-determined pattern in order to cause said laser beam to form character images on a photosensitive surface, locating means for indicating the location of said laser beam in the direction of said line by producing an electrical pulse for each small increment of distance moved from a reference point which is fixed relative to said photosensitive surface during photocomposition, and means for starting each back-and-forth scanning movement with one of said pulses.

27. A device as in claim 26 in which said locating means comprises a reticle located adjacent and extending parallel to said photosensitive surface, said reticle extending over substantially the entire distance of a full line of characters on said photosensitive surface, means for directing a portion of said laser beam onto said reticle, and photodetector means for detecting laser energy from said reticle and converting it into said pulses.

28. A device as in claim 27 in which said reticle is an elongated refractive bar with a line grating on one surface and a reflective coating on other surfaces except for one or more restricted outlets, said photodetector means being located to receive laser energy transmitted through the openings between the lines of said gratings, reflected internally within said bar, and transmitted outwardly through said outlets.

29. A device as in claim 27 in which the lines of said grating are spaced relatively farther apart than the desired spacing between adjacent scan paths, and means for generating a plurality of additional pulses of equal timing in response to said pulse.

30. A device as in claim 26 including a linear reticle substantially co-extensive with the full width of said photosensitive surface, means for projecting a portion of said laser beam onto said reticle, detector means for detecting laser energy from said reticle and converting said energy into electrical signals, starting means for starting each sweep movement of said beam, said starting means including a clock source, and a phase-locked-loop interconnecting said detector means and said clock source for synchronizing said clock source with said detector means.

* * * * *